United States Patent Office 3,657,202
Patented Apr. 18, 1972

3,657,202
ETHYLENE/SULFUR DIOXIDE BIPOLYMERS AND METHOD OF MAKING
Clarence Frederick Hammer and Thomas Fujio Sashihara, Wilmington, Del., assignors to E. I. du Pont de Nemours and Company, Wilmington, Del.
No Drawing. Filed Apr. 28, 1970, Ser. No. 32,741
Int. Cl. C08f 13/06
U.S. Cl. 260—79.3 A         3 Claims

ABSTRACT OF THE DISCLOSURE

Bipolymers of ethylene and sulfur dioxide which are essentially free of 1:1 molar ratio of ethylene and sulfur dioxide are provided. Processes for preparing these bipolymers are also provided. The bipolymers consist essentially of at least about 50 percent by weight ethylene and about 0.1 to 50 percent by weight sulfur dioxide. The absence of 1:1 molar ratio of ethylene and sulfur dioxide are evidenced by the bipolymers having an absorption band at about 16 to 17$\mu$ in the infrared spectra and being essentially free of two absorption bands between 13.5 and 14$\mu$ in the infrared spectra, respectively. By varying the amount of the highly polar sulfur dioxide in the bipolymers, shaped articles (e.g., molded articles and films) from the bipolymers or from blends of the bipolymers with other solid organic polymers, such as a vinyl chloride polymer, can be flexible or rigid, and possess improved properties of polyethylene.

BACKGROUND OF INVENTION

Field of invention

This invention relates to ethylene bipolymers, processes for their preparation, and compositions and shaped articles formed therefrom. More particularly, this invention relates to ethylene/sulfur dioxide bipolymers, bulk polymerization processes for their preparation, and polymeric blends and shaped articles formed therefrom.

Prior art

Ethylene polymers are characterized by being very low in polarity. They are like waxes in this aspect, have a low dielectric constant, and are soluble in hot oils, hot wax and hot hydrocarbons. For some uses, it would be desirable to impart more polarity to such polymers to provide improved adhesion to more polar materials and resistance to hydrocarbon solvents and oils. A small degree of polarity can be imparted to the ethylene chain by the use of unsaturated organic esters, such as vinyl acetate or acrylates, in the polymerization; however, to obtain a high degree of polarity requires high levels of ester which then destroys the inherent advantages of the long flexible hydrocarbon chain, low cost, good low temperature behavior, etc. Thus, it is desired to increase the polarity of an ethylene polymer while retaining the hydrocarbon chain as the major feature of the polymer.

A highly polar monomer which is a candidate for increasing the polarity of polymers is sulfur dioxide; however, copolymerizing sulfur dioxide with ethylenically unsaturated monomers gives resulting copolymers having too much sulfur dioxide present, and thus too much polarity. The reason is found from the extensive history of sulfur dioxide polymerization. It is found in the art that sulfur dioxide does not homopolymerize but must be incorporated with another monomer such as ethylenically unsaturated monomers. The early art teaches that adjacent —$SO_2$— (sulfone) groups will never be found in polymer chains. Furthermore, polymers always consisted of alternating units of sulfur dioxide and the ethylenically unsaturated comonomer. Workers in the art invariably reported copolymers having a 1:1 molar ratio of sulfur dioxide and the ethylenically unsaturated comonomer.

Since sulfur dioxide is an abundant and cheap chemical, copolymers were extensively investigated. All such copolymers suffered from extremely high melting point or some deficiency, such as thermal instability, so that they were not suitable for commercial use, even though the sulfone groups provided some desirable properties. For example, 1:1 molar bipolymers of ethylene and sulfur dioxide do not soften or melt until the temperature is so high that the polymers begin to decompose. Thus, it is impossible to extrude or mold such polymers in conventional equipment.

Workers then began studies in an attempt to modify slightly the 1:1 molar composition to provide polymers which could be molded or extruded at suitable lower temperatures. Such polymers are described in U.S. Pat. 2,703,793 to Marcus A. Naylor, Jr., issued Mar. 8, 1955, for propylene/sulfur dioxide/acrylate systems; U.S. Pat. 2,634,254 to Robert D. Lipscomb, issued Apr. 7, 1953, for combining carbon monoxide in ethylene/sulfur dioxide systems; and U.S. Pat. 2,976,269 to Jan Ide de Jong, issued Mar. 21, 1961, for systems in which the molar ratio was shifted by incorporating long blocks of polyethylene with 1:1 blocks of ethylene/sulfur dioxide. In most of these efforts, however, the polymers still contain large percentages of sulfur dioxide and 1:1 molar ratio of sulfur dioxide and the ethylenically unsaturated comonomer.

SUMMARY OF THE INVENTION

According to the present invention there is provided an ethylene bipolymer consisting essentially of at least about 50 percent by weight ethylene and about 0.1 to 50 percent by weight sulfur dioxide, said bipolymer being essentially free of groups consisting of two sulfur atoms separated by two carbon atoms.

There is also provided a process for preparing the above bipolymer which comprises (1) continuously reacting ethylene and sulfur dioxide in proportions to provide a bipolymer consisting essentially of at least about 50 percent by weight ethylene and about 0.1 to 50 percent by weight sulfur dioxide, in a pressurized, stirred reaction zone maintained at a temperature of at least 140° C. with a free-radical catalyst wherein the contents throughout the reaction zone are kept uniform with respect to the molar ratio of ethylene and sulfur dioxide, (2) continuously separating the bipolymer from unreacted ethylene and sulfur dioxide, and (3) continuously discharging (venting or recycling) said unreacted ethylene and sulfur dioxide.

Also provided are shaped articles from the bipolymers, polymeric blends of the bipolymers and other solid organic polymers, and shaped articles from the blends.

DETAILED DESCRIPTION OF INVENTION

In preparing the bipolymers of the present invention, commercially available ethylene and sulfur dioxide of about 100 percent purity are used initially and in supplying the continuous make-up for the feed stream. The reactor vessel used is capable of withstanding high pressures and temperatures, and is equipped with a high speed, motor-driven stirrer and pressure relief valves, and jacketed walls for circulating heating or cooling fluids to control temperatures. The effectiveness of such control depends on the size of the reactor and the amount of heat generated by the polymerization reaction. Sulfur dioxide is pumped into the ethylene monomer feed stream at the pressure of the reactor and the mixture pumped into the reactor, also at reactor pressure. Catalyst as necessary is pumped into the reactor through a separate line.

A mixture of bipolymer and monomers leaves the reactor and the pressure is reduced as the mixture flows into a separator. Monomers leave the separator and are either vented or pumped for recycle to the reactor together with make-up ethylene and sulfur dioxide. Molten polymer leaves the separator in a stream, from which it is cooled and further processed, such as cutting the bipolymer into suitable sized particles or, if the copolymer is tacky (low molecular weight), blending it with about 1 to 10 percent by weight of a vinyl chloride polymer or another type of compatible high molecular weight polymer in order to improve its handling characteristics.

The flow of ethylene, sulfur dioxide and catalyst into the reactor is carefully controled so that they enter the reactor in constant, continuous molar ratios and at the same continuous rate that the product and unreacted monomers are discharged from the reactor. The rates and molar ratios are adjusted so as to provide from about 0.1 to 50 percent by weight sulfur dioxide (about 30 molar percent maximum), preferably between about 2 to 25 percent by weight of sulfur dioxide in the ethylene bipolymer, and, to keep the conversion less than 20 percent, preferably between 5 and 15 percent. Effective stirring, i.e., usually at a rate of at least about 0.25 horsepower/gal. of reactor volume, is provided in order to keep the reacting monomers in intimate admixture throughout the reactor. The reactor temperature should be at least 140° C. It is preferred that the reactor temperature be maintained within the range of about 155 to 300° C., most preferably 155 to 225° C., and the reactor pressure be maintained within the range of 5,000 to 60,000 p.s.i., preferably 20,000 to 35,000 p.s.i.

It is important in preparing the ethylene bipolymer of the present invention that the contents of the reactor be kept uniform with respect to the molar ratio of ethylene and sulfur dioxide in order for the bipolymer to be essentially free of 1:1 molar ethylene and sulfur dioxide (the group $-SO_2-CH_2-CH_2-SO_2-$ does not appear in the polymer chain when the bipolymer is subjected to infrared analysis), and to avoid the ethylene/sulfur dioxide polymers of the prior art having a 1:1 molar ratio of ethylene and sulfur dioxide. In other words, the sulfur dioxide in the reactor must never be depleted so that only ethylene is reacting. Since sulfur dioxide reacts much faster than ethylene, a larger percentage of the sulfur dioxide present reacts than the percentage of the ethylene which reacts in a given time. Consequently, the sulfur dioxide is fed at a lower molar ratio than desired in the final polymer.

The free-radical polymerization catalyst employed in the process can be any of those commonly used in the polymerization of ethylene such as the peroxides and more specifically the peresters, the azo compounds, or the percarbonates. Selected compounds within these groups are dilauroyl peroxide, ditertiary butyl peroxide, tertiary butyl perisobutyrate, tertiary butyl peracetate, $\alpha,\alpha'$-azobisisobutyronitrile and other compounds of comparable free-radical activity. Usually, the catalyst will be dissolved in a suitable inert organic liquid solvent such as benzene, kerosene, mineral oil or mixtures of solvents. The usual catalyst level is used, about 25 to 2500 p.p.m., preferably about 75 to 500 p.p.m., based on the weight of the monomers fed to the reactor, and ranging from the low side to the high side as the amount of sulfur dioxide is increased.

The ethylene bipolymers of the present invention can be used for making self-supporting film, cable jacketing and conduit, and used in many polyethylene application areas. Bipolymer properties and resulting end-use applications can be varied by varying the melt index or by varying the sulfur dioxide content in the bipolymer. Melt indices can be between 0.1 and 3000, preferably between 1 and 1000. Ethylene bipolymers containing about 10 percent by weight sulfur dioxide have much higher film clarity in unoriented films than do the polyethylene resins, but process in a manner similar to polyethylene. Also, ethylene bipolymers containing about 20 to 25 percent by weight sulfur dioxide have very high oil and solvent resistance. In general, at any given length of time, the higher the sulfur dioxide content of the bipolymer, the greater its resistance to peanut (vegetable) and mineral oils, i.e., the slopes of the "oil absorbed versus time" curves for the bipolymers decrease with increasing sulfur dioxide content. Water absorption of the bipolymers is directly proportional to sulfur dioxide content, but in all cases it is relatively low. The stiffness of the bipolymers is only slightly decreased by water absorption at equilibrium at all levels of comonomer content. When the bipolymer contains less than about 25 percent by weight of sulfur dioxide, the sulfur dioxide groups have a negligible effect on the thermal stability, i.e., polymer chain integrity, as determined by thermogravimetric analysis. Gas permeability decreases with increasing sulfur dioxide content.

Physical property results indicate that the bipolymers provide an entirely different combination of properties than would be expected from incorporating an equivalent amount of an ester, such as vinyl acetate or an alpha-olefin, such as octene-1. Crystallinity dependent properties, i.e., hardness, stiffness, toughness, stress crack resistance, and solubility, for the ethylene/sulfur dioxide bipolymers are similar to those for polyethylene, whereas these properties decrease markedly for other copolymers. Unlike ethylene/vinyl acetate copolymers, stiffness of the bipolymers increases with increasing comonomer content. While bipolymer solubility in certain solvents (e.g., aniline, toluene, 2-nitropropane and chloroform) increases with increasing sulfur dioxide content, the solubility in other solvents (e.g., n-hexane, dimethyl sulfoxide and nitromethane) is not essentially different from the solubility of polyethylene in these solvents.

The ethylene/sulfur dioxide bipolymers have better environmental stress crack resistance (ESCR) than polyethylene homopolymers. For instance, bipolymers containing about 10 percent sulfur dioxide and having melt indices of about 2 to 3 will have very few failures after 50 hours in the ESCR test. At a melt index of about 3.2, the time for 50 percent failure is about 24 hours. This is quite remarkable since free-radical polyethylene of equal flow and stiffness shows 50 percent failures in the ESCR test in less than 1 hour. Thus, the bipolymers show orders of magnitude over polyethylene in the ESCR test.

To a great extent, the valuable physical properties of the bipolymers of the present invention as compared to blocky copolymers of the prior art and to ethylene homopolymers are due to the internal structure of the copolymers. X-ray diffractions on bipolymers containing 5 to 32 percent by weight sulfur dioxide show that small amounts of sulfur dioxide cause a greater drop in crystallinity than is ordinarily seen with other comonomers such as methacrylic acid or vinyl acetate, but the bipolymers containing over 30 percent sulfur dioxide have a higher crystallinity. Bipolymers containing about 43 to 50 percent sulfur dioxide have crystallinities of 15 to 37 percent, whereas the ethylene/methacrylic acid and ethylene/vinyl acetate copolymers are generally completely amorphous in this range of compositions. This can be understood by comparison of the X-ray spectra of these materials at an X-ray wave-length range of 10–32A; thus, the crystallinity at the higher sulfur dioxide content is not the crystallinity of polyethylene but is the crystallinity of the ethylene/sulfur dioxide bipolymer. Thus, the polyethylene peaks at 21.4° (110 peak), 23.7° (200 peak) and 29.8° (210 peak) are substantially decreased at 5 percent sulfur dioxide and essentially eliminated at 10 percent sulfur dioxide (in addition, the 020 peak at 36.4° shows the same behavior). This means that there is very little polyethylene-type crystallinity in the 10 percent sulfur dioxide bipolymer, even though other ethylene copolymers contain 30 to 40 percent polyethylene-type crystallinity. Instead, there is a new crystalline structure that has its major peak at 19.4° along with minor peaks at about 21.1°, 22.5°, 22.9°, 23.8° and 24.3°. Some of this second crystalline structure can be observed in the spectrum of the 5 percent sulfur dioxide bipolymer, and more of it is observed (together with complete elimination of the polyethylene-type pattern) in the 15 percent sulfur dioxide bipolymer. However, at 21 percent sulfur dioxide and 26 percent sulfur dioxide this second structure decreases, and, by the time the sulfur dioxide content reaches 32 percent, the second structure has disappeared and a third crystalline structure showing peaks at 19.6°, 20.6° and 21.3° has taken its place.

In comparing the X-ray diffraction patterns with other properties, it is noted there is a drop in crystallinity with essentially no change in stiffness of the material; which indicates that a network of glassy domains forms from the polysulfone to give rigidity to the polymer. The second crystalline structure appears to correspond with the high tensile impact strength, Elmendorf tear strength and environmental stress crack resistance observed in the bipolymers containing about 10 percent sulfur dioxide. The elimination of the polyethylene-type crystallinity corresponds approximately with the minimum 12 percent sulfur dioxide level that is needed to give clear blends with polyvinyl chloride.

As mentioned earlier, a distinguishing feature of the bipolymers of the invention is the essential absence of 1:1 ethylene/sulfur dioxide groups or blocks in the bipolymer; thus, the sulfur dioxide is more dispersed in the bipolymer. The absence of these groups is indicated by infrared analysis and by kinetic data. The bipolymers of the invention have an infrared band at 13.9$\mu$ but not at 13.7$\mu$ as compared to ethylene homopolymers and ethylene/sulfur dioxide bipolymers having 1:1 ethylene-sulfur dioxide blocks which have doublet bands at both 13.7$\mu$ and 13.9$\mu$. In addition to the above, the bipolymers of the invention have a strong absorption band at about 16.7$\mu$. It has been found that the absence of bands in the 16 to 17$\mu$ range is indicative of 1:1 alternating units of ethylene and sulfur dioxide.

The ethylene bipolymers of the present invention are particularly useful for blending with other organic polymers, especially those that have polar characteristics, such as vinyl chloride polymers, to improve properties of the blend polymer. Generally, the bipolymers can be blended with the blend polymer (in any order of addition) by any of the usual techniques such as solution blending or melt blending on a roll mill, in an extruder or in a Banbury mixer, and the polymer composition thereby formed contains a compatible amount of the blend polymer and bipolymer of the invention, i.e., the blend can be in the range of from 1 to 99 percent by weight of the ethylene bipolymer and from 99 to 1 percent by weight of the blend polymer. If it is desired to use a low molecular weight ethylene bipolymer which is tacky, its handling characteristics can be improved by initially blending about 1 to 20 percent of a desired blend polymer with the ethylene bipolymer and then mixing in additional amounts of the blend polymer when desired. Usually, for most end-use applications of the blended polymeric composition, the composition will contain about 5 to 65 percent by weight of the bipolymer and 95 to 35 percent by weight of the blend polymer. The particular compatible level of bipolymer added will depend upon the particular blend polymer used, the bipolymer used and the physical properties desired in the shaped articles formed from the blend. However, if it is desired to impart some polarity to the blend polymer, the blended polymeric composition will contain about 1 to 5 percent by weight of the ethylene bipolymer.

The blend polymers used for preparing the polymeric compositions can be any organic polymer but it is preferred that the polymer have polar characteristics, which is indicative that the sulfur dioxide-containing ethylene bipolymer of the present invention will be compatible therewith on a molecular scale (clear). Blend polymers that can be used are polyamides; cellulose-derived polymers such as cellulose acetate, propionate, butyrate, regenerated cellulose and nitrocellulose; vinyl halide polymers in which the vinyl halide is at least 80 percent by weight of the polymer such as polyvinyl chloride, copolymers of vinyl chloride with olefins (ethylene and propylene particularly), vinyl acetate, and vinyl ethers, vinylidene halide polymers such as polyvinylidene fluoride and a copolymer of vinylidene chloride and vinyl chloride; alpha olefin based polymers having 2 to 12 carbon atoms such as polyethylene, polypropylene, chlorosulfonated polyethylene, polypropylene, chlorosulfonated polyethylene, chlorinated polyethylene as well as other halogenated mers neutralized with an alkali metal hydroxide), ethylene/vinyl ester copolymers (i.e., vinyl ester of saturated carboxylic acid such as vinyl acetate, vinyl propionate, vinyl butyrate, vinyl stearate) of about 15 to 98 percent vinyl ester and hydrolyzed polymers derived therefrom (ethylene/vinyl alcohol), polymers of styrene such as styrene/methacrylic acid, styrene/acrylonitrile; polymers of acrylonitrile such as polyacrylonitrile, copolymers of at least 40 percent acrylonitrile using other ethylenically unsaturated comonomers such as vinyl acetate, vinyl chloride, ethylene and isobutylene, acrylics such as alkyl esters of ethylenically unsaturated carboxylic acids such as alkyl acrylates and alkyl methacrylates wherein the alkyl group is from 1 to 18 carbon atoms; polyethers such as polyethylene terephthalate and poly - 1,4,cyclohexalene dimethylene terephthalate; polyurethanes; polycarbonates; phenolics; polysulfones; epoxy resins; chlorinated polyethers; alkyd resins; acetal resins; ABS resins; silicone resins; tars (asphalt) and waxes such as the petroleum waxes (paraffin wax and microcrystalline wax), and chlorinated waxes.

In making shaped articles from either the ethylene copolymers or the blended polymeric compositions, other materials can be added to perform their usual functions. For instance, anti-oxidants, ultraviolet light stabilizers, plasticizers, and pigments can be used. When the ethylene copolymer is used with the usual monomeric or low molecular weight plasticizers such as the phthalates, adipates and azaleates, the two materials can be used in any proportion. For instance, dioctyl phthalate as a plasticizer can be used at a concentration of up to 30 percent by weight of the composition or the composition can contain up to 40 percent by weight of a polyadipate.

As mentioned earlier, blends of polyvinyl chloride and the ethylene/sulfur dioxide bipolymer exhibit molecular incompatibility, measured by development of haze or a decrease in the solid-state physical properties, when the sulfur dioxide content of the bipolymer falls below about 12 percent, but there is a sufficient degree of molecular compatibility or molecular interaction to provide useful polymeric materials. Properties of the blends can be adjusted by varying the molecular weights of the blend polymer and ethylene/sulfur dioxide bipolymer and the amount of the bipolymer in the blend and by the use of external and/or internal lubricants. The polyvinyl chloride blends containing about 5 to 20 percent of the bipolymer, preferably 10 to 15 percent, with the percent sulfur dioxide in the bipolymer at least 12 percent, preferably 15 percent, are optically transparent, colorless compositions which would be classified as modified rigid polyvinyl chlorides having primary utility in the rigid vinyl bottle area, although these blends can be used for any rigid vinyl application requiring transparency. All compatible bipolymers act as highly efficient processing aids for polyvinyl chloride in that they lower the melt viscosity of the polyvinyl chloride, allowing it to be melt processed at lower temperatures with attendant lower polyvinyl chloride thermal degradation. Generally, shaped articles from the blend are rigid when the bipolymer content is from about 5 to 20 percent, semi-rigid when the bipolymer content is from about 25 to 40 percent and flexible when the bipolymer content is from about 40 to 95 percent.

The invention is further understood by the following examples in which parts and percentages are by weight unless otherwise indicated.

EXAMPLES 1 TO 21

Bipolymers of ethylene and sulfur dioxide were prepared by admixing ethylene and sulfur dioxide and feeding the mixture at the weight ratios shown in Table I into a 700 cc. highly stirred reaction vessel together with a catalyst fed at a rate sufficient to obtain the desired conversion. In the various examples, the pressure of the reactor was about 24,000 p.s.i. and the temperature was maintained between 165 and 210° C. Reactor conversion ranged between 8 and 16% with reactor residence times of 1.1 and 4 minutes. The reaction mixture was discharged from the reactor and subsequent processing was carried out, as previously described, by recycling unreacted monomer (except in Examples 7 to 21 where the monomers were fed once through the reactor and discarded) and cooling the molten polymer and cutting it into pellets. Melt index of the polymers was determined according to ASTM-D-1238-65T, condition E. The reaction conditions and the resulting copolymer compositions for each example are shown in Table I. The polymers were then molded into the standard compression-molded bars for physical testing. The bars were molded by placing a polymer sample in a hot press (130-140° C.), allowing the sample to heat for 2 to 3 minutes and then applying a pressure of about 40,000 lbs. force. After about 2 to 3 minutes at pressure, the sample is cooled in the press. The physical properties of the resulting bipolymers are shown in Table II.

TABLE I.—BIPOLYMERS OF ETHYLENE AND SULFUR DIOXIDE

| Example No.: | Comonomer-ratio (weight percent E/SO$_2$) | MI | Temperature, (° C.) | Percent conversion | Catalyst [1] | Catalyst-concentration, p.p.m. in benzene [2] | Feed-ratio E/SO$_2$, parts by weight | Residence time (min.) |
|---|---|---|---|---|---|---|---|---|
| 1 | 79/3 | 11.0 | 200 | 14.0 | Lupersol 80 [3] | 6692.0 | 10/.046 | 1.1 |
| 2 | 97/3 | 18.0 | 200 | 14.8 | ....do........ | 6692.0 | 10/.048 | 1.1 |
| 3 | 97/3 | 5.0 | 210 | 16.0 | t-Butyl peracetate | 4,572.0 | 10/.05 | 1.1 |
| 4 | 97/3 | 8.0 | 210 | 16.0 | ....do........ | 4,572.0 | 10/.038 | 1.1 |
| 5 | 92/8 | 9.0 | 186 | 16.0 | t-Butyl perisobutyrate | 8,922.0 | 10/.063 | 1.1 |
| 6 | 92/8 | 3.0 | 184 | 13.0 | ....do........ | 8,922.0 | 10/.063 | 1.1 |
| 7 | 91/9 | 0.5 | 171 | 8.3 | VAZO [1] | 1,101.5 | 10/.11 | 4 |
| 8 | 90/10 | 0.17 | 168 | 9.6 | ....do.[1] | 1,321.6 | 10/.10 | 4 |
| 9 | 89/11 | 0.5 | 171 | 8.3 | ....do.[1] | 1,321.6 | 10/.11 | 4 |
| 10 | 85/15 | 118 | 170 | 10.25 | ....do.[1] | 2,690.0 | 10/.16 | 4 |
| 11 | 85/15 | 14.5 | 165 | 10.28 | ....do.[1] | 2,775.0 | 10/.16 | 4 |
| 12 | 84/16 | 4.7 | 170 | 10.9 | ....do.[1] | 2,203.0 | 10/.20 | 4 |
| 13 | 82/18 | 0.84 | 170 | 8.0 | ....do.[1] | 2,203.0 | 10/.20 | 4 |
| 14 | 81/19 | 19.0 | 170 | 9.2 | ....do.[1] | 2,203.0 | 10/.20 | 4 |
| 15 | 80/20 | 1.6 | 170 | 9.4 | ....do.[1] | 2,230.0 | 10/.21 | 4 |
| 16 | 77/23 | 0.67 | 170 | 9.6 | ....do.[1] | 2,230.0 | 10/.27 | 4 |
| 17 | 74/26 | 7.06 | 170 | 12.7 | ....do.[1] | 2,203.0/2,754.0 | 10/.30 | 4 |
| 18 | 74/26 | 10.7 | 170 | 10.4 | ....do.[1] | 3,304.0 | 10/.30 | 4 |
| 19 | 74/26 | 0.76 | 170 | 12.6 | ....do.[1] | 2,304.0 | 10/.30 | 4 |
| 20 | 69/31 | 11.1 | 167 | 10.6 | ....do.[1] | 5,506.0 | 10/.50 | 4 |
| 21 | 66/34 | 7.7 | 169 | 9.1 | ....do.[1] | 5,506.0 | 10/.38 | 4 |

[1] VAZO=azo-bis-isobutyronitrile.
[2] Except Lupersol 80.
[3] Lupersol 80: 75% t-butyl perisobutyrate in mineral spirits.

TABLE II.—PROPERTIES OF BIPOLYMERS OF ETHYLENE AND SULFUR DIOXIDE

| Example No.: | Stiffness [1] (×1,000 p.s.i.) conditioned 23° C., 50% R.H. | Tensiles [2] at 2"/minimum | | | | Tensile impact strength [3] (ft. lbs./in.$^2$) | Elmendorf tear strength (g./mil.) | VICAT temperature (° C.) | H$_2$O absorbent 7 days at 23° C. (percent) | NUJOL absorbent 2.4 hrs. at 60° C. (percent) | Peanut oil absorbent 2.5 hrs. at 60° C. (percent) |
|---|---|---|---|---|---|---|---|---|---|---|---|
| | | 100% modulus (p.s.i.) | Yield stress (p.s.i.) | Breaking strength (p.s.i.) | Ultimate elongation (percent) | | | | | | |
| 1 | 30.3 | 1,474 | 1,444 | 1,474 | 430 | 57 | 73 | 97 | | | |
| 2 | 29.2 | 1,403 | 1,395 | 1,415 | 238 | 55 | 88 | 96 | | | |
| 3 | 30.9 | 1,460 | 1,455 | 1,466 | 477 | 109 | 98 | 98 | | | |
| 4 | 28.6 | 1,407 | 1,387 | 1,416 | 508 | 111 | 99 | 96 | | | |
| 5 | 35.4 | 1,330 | 1,290 | 1,390 | 460 | 61 | 98 | 96 | | | |
| 6 | 31.3 | 1,420 | 1,270 | 1,550 | 390 | 101 | 144 | 94 | | | |
| 7 | 33.8 | 1,400 | 1,160 | 2,320 | 650 | 192 | 183 | 96 | 0.27 | 0.35 | 0.34 |
| 8 | 20.9 | 1,410 | 1,060 | 2,620 | 710 | 209 | 202 | 96 | .08 | 0.23 | 0.15 |
| 9 | 33.8 | 1,440 | 1,150 | 2,730 | 740 | 177 | 96 | 96 | 0.20 | 0.27 | |
| 10 | 49.7 | 1,450 | 1,590 | 1,470 | 100 | 55 | 38 | 89 | | | |
| 11 | 37.7 | 1,570 | 1,520 | 1,900 | 420 | 80 | 117 | 91 | | | |
| 12 | 31.7 | 1,690 | 1,500 | 2,030 | 460 | 70 | 126 | 90 | 0.40 | 0.14 | |
| 13 | 32.6 | 1,760 | 1,690 | 1,190 | 330 | 68 | 112 | 90 | 0.40 | 0.16 | 0.10 |
| 14 | | | | | | | | | | | |
| 15 | 33.0 | 1,760 | 1,750 | 1,940 | 370 | 64 | 147 | 88 | 0.44 | 0.15 | 0.10 |
| 16 | 34.7 | 1,860 | 1,920 | 1,910 | 260 | 67 | 98 | 90 | 0.44 | 0.14 | |
| 17 | 43.3 | 2,030 | 2,190 | 1,990 | 200 | 61 | 77 | 91 | 0.66 | 0.12 | 0.09 |
| 18 | 46.7 | 2,290 | 2,370 | 2,110 | 150 | 11 | 57 | 91 | 0.72 | | |
| 19 | 35.5 | 2,050 | 2,110 | 1,920 | 180 | 56 | 77 | 94 | 0.67 | 0.10 | 0.09 |
| 20 | 64.5 | | | 1,920 | 30 | 0 | ([5]) | 92 | 0.73 | | |
| 21 | 56.1 | | | 2,080 | 30 | 4 | ([5]) | 92 | 0.80 | | |

[1] ASTM-D-747.
[2] ASTM-D-412.
[3] ASTM-D-1723-61T.
[4] ASTM-D-1515.
[5] Brittle.

The tensile impact strengths show an increase with decreasing melt index and show a maximum at about 10 percent sulfur dioxide. These results on tensile impact strength combined with the results on Elmendorf tear strength show the bipolymer to be tough.

The bipolymers of Examples 14 and 16 were subjected to infrared analysis on a Perkin-Elmer 337 infrared spectrophotometer. Films less than 0.002 inch in thickness were pressed at 210° C. and 40,000 pounds platen pressure using a two-minute preheat, one minute up to pressure, one minute at full pressure and a water quench at full pressure. The most significant bands in the spectra are the bands at 13.9μ and 16.7μ which are indicative that the bipolymers are essentially free of 1:1 alternating units of ethylene and sulfur dioxide.

EXAMPLES 22 TO 47

Using the ethylene/sulfur dioxide bipolymers of Examples 10, 11, 12, 13 and 16, the bipolymers were mill blended on a 3" roll mill heated to 180° C. with various vinyl chloride polymers, with the ultimate melt temperature being 185° C. In all examples, the bipolymer was banded to the mill first, then the vinyl chloride polymer stabilized with a di[substituted], tin-S,S'-bis(isooctylmercapto acetate) thermostabilizer ("Thermolite" 31 sold by M & T Chemicals Inc.) was added. Total component addition time was 2–3 minutes and the total mill time for sufficient blending was 10–12 minutes. The blend was taken off the hot mill and sheeted out by running it through a mill maintained at room temperature. The blends, all of which were clear, were then made into standard test specimens by comparison molding at 185–190° C. at 40,000 p.s.i.g. and cycle times of 3–5 minutes followed by gradual cooling at full pressure. The results are shown in Table III.

What is claimed is:

1. A process for preparing an ethylene bipolymer comprising: (1) continuously reacting ethylene and sulfur dioxide in proportions to provide a bipolymer consisting of at least about 50 percent by weight ethylene and about 0.1 to 50 percent by weight sulfur dioxide, in a pressurized, stirred reaction zone maintained at a temprature of at least 140° C. with a free-radical catalyst wherein the contents throughout the reaction zone are kept uniform with respect to the molar ratio of ethylene and sulfur dioxide, (2) continuously separating the bipolymer from unreacted ethylene and sulfur dioxide, and (3) continuously discharging said unreacted ethylene and sulfur dioxide.

2. The process of claim 1 wherein the pressure is within the range of 5,000 to 60,000 p.s.i., the temperature is within the range of about 155 to 300° C. and the free-radical catalyst is an azo catalyst or a peroxide catalyst.

3. The process of claim 1 wherein the reaction zone is stirred at a rate of at least about 0.25 horsepower/gal. of reactor volume, the pressure is within the range of about 20,000 to 35,000 p.s.i., the temperature is within the range of about 155 to 225° C., the unreacted ethylene and sulfur dioxide are recycled and the free-radical catalyst is an azo catalyst or a peroxide catalyst.

TABLE III.—CLEAR VINYL CHLORIDE POLYMER BLENDS WITH E/SO₂ BIPOLYMERS

| Example No. | PVC// E/SO₂ ratio, parts by weight | PVC type | E/SO₂ (example number) | Tensile strength (p.s.i.) | Flexural modulus[1] (p.s.i.) | Elongation[1] (percent) | Elmendorf tear[1] strength (g./mil.) | Izod impact[1] (ft.-lbs./in.) | Melt flow rate[1] (g./10 min.) | Heat distortion Temp.,[1] 264 p.s.i. (° C.) |
|---|---|---|---|---|---|---|---|---|---|---|
| Control | 100//0 | PVC ("Diamond" 40) | | 6,520 | 425,000 | 54 | | 0.31 | 0.04 | 71 |
| 22 | 90//10 | do | (10) 85/15 | 6,333 | 371,000 | 123 | 48 | 1.0 | 1.10 | 65 |
| 23 | 90//10 | do | (12) 84/16 | 6,639 | 399,000 | 157 | 92 | 0.7 | 0.6 | 62 |
| 24 | 90//10 | do | (12) 84/16 | 6,103 | 367,000 | 130 | 100 | 1.0 | 0.7 | 65 |
| 25 | 90//10 | do | (13) 82/18 | 6,493 | 369,000 | 150 | 110 | 0.7 | 0.5 | 63 |
| 26 | 90//10 | do | (16) 79/21 | 6,516 | 340,000 | 160 | 120 | 0.7 | 0.5 | 62 |
| 27 | 85//15 | do | (10) 85/15 | 5,868 | 329,000 | 73 | 71 | 1.2 | 2.2 | 63 |
| 28 | 85//15 | do | (12) 84/16 | 5,590 | 341,000 | 150 | 21 | 0.6 | 1.7 | 61 |
| 29 | 85//15 | do | (12) 84/16 | 5,988 | 372,000 | 143 | 92 | 0.6 | 1.3 | 60 |
| 30 | 80//20 | do | (10) 85/15 | 5,418 | 276,000 | 160 | 125 | 0.75 | 0.80 | 58 |
| 31 | 80//20 | do | (12) 84/16 | 5,452 | 300,000 | 153 | 125 | 0.7 | 0.85 | |
| 32 | 80//20 | do | (12) 84/16 | 4,374 | 318,000 | 5 | | 0.3 | 7.40 | 58 |
| 33 | 80//20 | do | (13) 82/18 | 5,466 | 324,000 | 133 | 99 | 0.6 | 2.1 | 56 |
| 34 | 80//20 | do | (16) 79/21 | 5,212 | 283,000 | 193 | | 0.7 | 1.0 | 54 |
| 35 | 70//30 | do | (10) 85/15 | 4,242 | 208,000 | 177 | 66 | 0.7 | 2.6 | 48 |
| 36 | 70//30 | do | (16) 79/21 | 5,296 | 261,000 | 190 | 150 | 0.6 | 2.8 | 46 |
| 37 | 60//40 | do | (10) 85/15 | 3,799 | 165,000 | 170 | 55 | 0.7 | 4.9 | 42 |
| 38 | 60//40 | do | (16) 79/21 | 4,019 | 197,000 | 213 | 95 | 0.7 | 1.1 | 40 |
| 39 | 50//50 | do | (11) 85/15 | 3,044 | 161,000 | 190 | 57 | 0.6 | 8.4 | 38 |
| 40 | 40//60 | do | (11) 85/15 | 2,754 | 119,000 | 173 | 54 | 0.7 | | 39 |
| 41 | 30//70 | do | (11) 85/15 | 2,530 | 93,000 | 213 | 60 | 15 | | 36 |
| 42 | 20//80 | do | (11) 85/15 | 2,159 | 80,000 | 200 | 67 | 15 | | 35 |
| 43 | 10//90 | do | (11) 85/15 | 1,980 | 57,000 | 163 | 61 | 15 | | 33 |
| 44 | 80//20 | (²~) | (10) 85/15 | 6,267 | 294,000 | 0.25 | Brittle | 0.57 | 69.3 | 53 |
| 45 | 20//80 | do.² | (10) 85/15 | 1,769 | 7,000 | 63 | 33.3 | 0.32 | 388.0 | 36 |
| Control | 100//0 | do.² | | 6,914 | 412,000 | 128 | 88.7 | 0.51 | 24.8 | 60 |
| 46 | 80//20 | (³~) | (10) 85/15 | 4,652 | 297,000 | 0.50 | Brittle | 0.95 | 3.38 | 56 |
| 47 | 20//80 | do.³ | (10) 85/15 | 1,900 | 8,000 | 43 | 26.3 | 0.42 | 326.2 | 38 |
| Control | 100//0 | do.³ | | 6,846 | 425,000 | 215 | 96.8 | 0.63 | 0.97 | 62 |

[1] Melt flow rate=ASTM Standard D-1238-65T, condition N; Heat distortion temperature=ASTM Standard D-648-56; Izod impact strength= ASTM Standard D-256-56; Elmendorf tear strength=ASTM Standard D-1922-67; Flexural modulus= ASTM Standard D-790-66; Tensile strength= ASTM Standard D-1708-66.
[2] ~ 92% VC/~8% prop. (Airco 7008).
[3] ~95% VC/~5% ethy. ("Bakelite" QSQH-7).

From Table III it can be seen that within the sulfur dioxide variance range of 15–21% sulfur dioxide, for any given vinyl chloride polymer-ethylene/sulfur dioxide bipolymer blend large changes in heat distortion temperatures are not discernible. Heat distortion temperature is more affected by changes in the total ethylene/sulfur dioxide bipolymer content in the blend. Also, at constant copolymer sulfur dioxide content and molecular weight, as the percent bipolymer in the blend increases, tensile strength and flexural modulus decrease and properties of the blends vary from rigid (low bipolymer content, i.e., 5 to 20%), to semi-rigid (intermediate bipolymer content, i.e., 20 to 40%) to flexible (high bipolymer content, i.e., 40 to 95%). At constant bipolymer sulfur dioxide content and molecular weight, elongation is relatively invariant for blends containing up to 50% bipolymer and Izod impact strength is relatively constant for blends containing up to 30% bipolymer.

References Cited

UNITED STATES PATENTS

| | | | |
|---|---|---|---|
| 2,293,023 | 8/1942 | Hills | 260—79.3 A |
| 2,507,526 | 5/1950 | Jacobson | 260—79.3 A |
| 2,556,799 | 6/1951 | Crouch | 260—79.3 A |
| 2,634,254 | 4/1953 | Lipscomb | 260—63 R |
| 2,943,077 | 6/1960 | de Jong | 260—79.3 A |

FOREIGN PATENTS

| | | | |
|---|---|---|---|
| 1,356,595 | 2/1964 | France | 260—79.3 |

JOSEPH L. SCHOFER, Primary Examiner

C. A. HENDERSON, Jr., Assistant Examiner

U.S. Cl. X.R.

260—823, 827, 836, 844, 849, 857 L, 858, 873, 887, 896, 897, 898, 899, 901, 28.5 A, 13